June 19, 1934. R. L. TRIPLETT 1,963,284
PORTABLE ELECTRICAL MEASURING INSTRUMENT
Filed Aug. 4, 1933
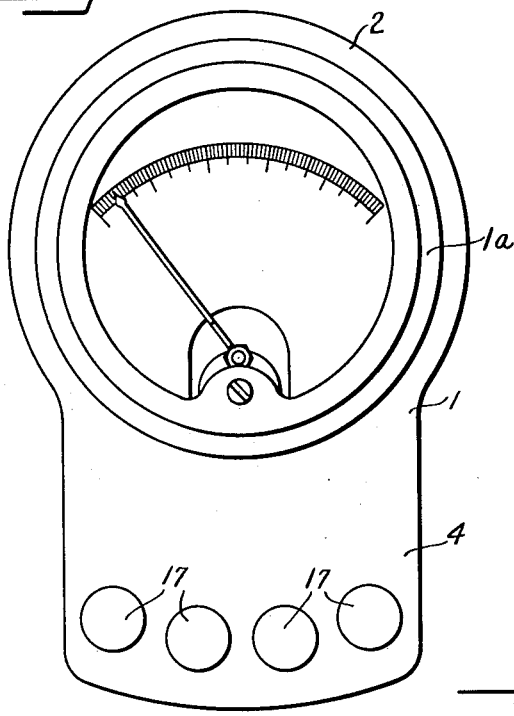
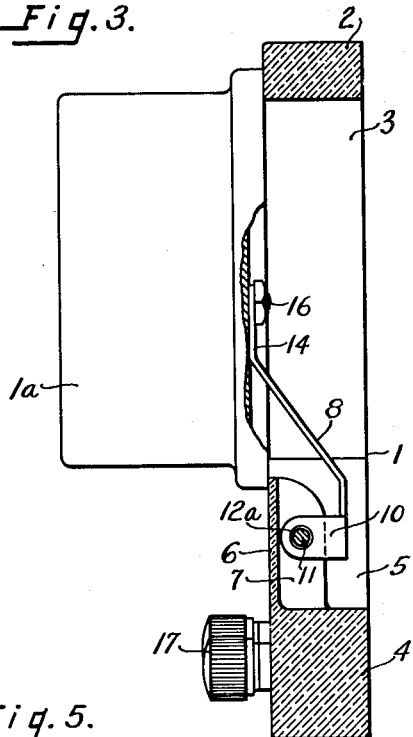
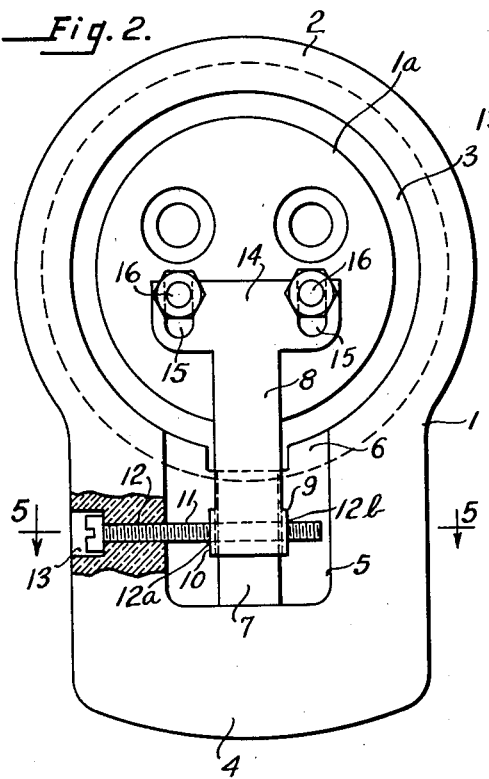
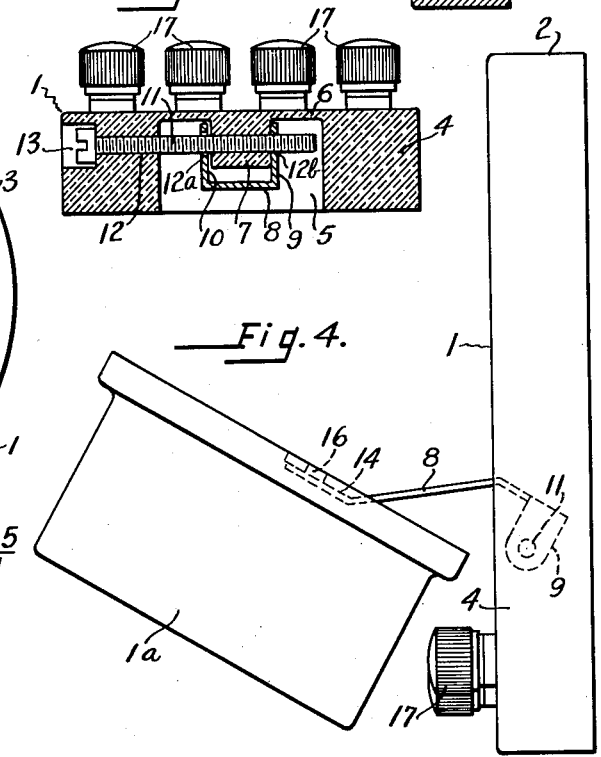
INVENTOR
RAY L. TRIPLETT.
BY Toulmin & Toulmin
ATTORNEYS Patented June 19, 1934

1,963,284

UNITED STATES PATENT OFFICE 1,963,284

PORTABLE ELECTRICAL MEASURING INSTRUMENT

Ray L. Triplett, Bluffton, Ohio

Application August 4, 1933, Serial No. 683,656

3 Claims. (Cl. 171—95)

This invention relates to improvements in supports for measuring instruments, and has for its object to provide, in connection with an indicating instrument, means for supporting the instrument so that its face is perpendicular to the line of vision of the user, and for that purpose the instrument is provided with a base and an arm, by which it is pivotally and adjustably supported on the base.

It is particularly the object of this invention to provide, in connection with an indicating apparatus, a free base, a measuring instrument and means for supporting the measuring instrument on the base in such a manner that its face may be varied to suit the line of vision of the user.

These and other advantages will appear from the following description taken in connection with the drawing.

Referring to the drawing:

Figure 1 is a front elevation of an indicating apparatus according to the present invention.

Figure 2 is a rear elevation with a part broken away to show the means by which the indicating instrument is supported on the base.

Figure 3 is a section through the base with part of the indicating instrument broken away to show the nature of the connection between the base and the indicating instrument.

Figure 4 is a side elevation of the indicating apparatus with the indicating instrument supported at an angle to the base.

Figure 5 is a section on the line 5—5 of Figure 2.

The apparatus consists essentially of three parts, a base 1, composed of some insulating material such as bakelite, hard rubber or the like, an indicating instrument 1a supported on the base by means of an arm 8 in the form of a plate.

The base is elongated and is circular at one end 2, with a hole 3 therein. On the other end of the base, remote from the circular end, is a somewhat rectangular extension 4, which has a cavity 5 therein having a bottom 6, from which a rib 7 projects into the cavity. On one end of the arm 8, at one side, is a flange 9, while on the other side there is a flange 10 parallel to the flange 9 and at right angles to the arm. These flanges extend from one side of the arm and engage opposite sides of the rib 7. These flanges have holes to receive a screw 11, which projects through a hole 12 in one side of the extension 4.

The hole 12a in the flange 10 is larger than the screw so that the screw will freely move therein, while the hole 12b in the flange 9 is threaded to receive the threaded end of the screw 11. The hole 12 is also larger than the screw so that the screw will freely move therein, and has adjacent its outer end a seat 13 in which the head of the screw is embedded so it will not offer any obstruction to the handling of the base.

On the end of the arm or plate 8, remote from the flanges, is a head 14 composed of laterally extending arms which have therein elongated slots 15 to receive screws or bolts 16 for attaching the indicating instrument to the arm. The base has a plurality of binding posts 17. By means of the flanges, the rib and the screw, the plate and the indicating instrument may be adjusted with relation to the base.

By proper manipulation of the screw the flange 9 may be forced into frictional engagement with the rib so the plate will be stationary with regard to the rib and the base. In order to release the plate or arm the screw is properly rotated so that the flange 9 will be moved away from the side of the rib, after which the arm may be rotated about the screw to properly position the indicating instrument. After the indicating instrument has been positioned the screw 11 may be rotated to bring the flange 9 into frictional engagement with one face of the rib. This is brought about by the contact of the head of the screw with the bottom of the seat.

It will be understood that I desire to comprehend within my invention such modifications as come within the scope of my claims and my invention.

Having thus fully described my invention, what I claim as new and desire to secure by Letters Patent, is:

1. In an indicating apparatus, a base having one end circular with a hole therein and a cavity in the other end in one side of the base, a rib in the cavity, an indicating instrument, and means engaging the rib to support the indicating instrument over the hole on the other side of the base.

2. In an indicating apparatus, a base having one end circular with a hole therein and a cavity in the other end in one side of the base, a rib in the cavity, an indicating instrument, and an arm attached at one end to the indicating instrument and adjustably attached at its other end to the rib for supporting said instrument adjacent the hole on the other side of the base.

3. In an indicating apparatus, a base having one end circular with a hole therein and a cavity in the other end, a rib in the cavity, an indicating instrument, and an arm extending through the hole attached at one end to said instrument for longitudinal adjustment of the instrument on the arm and attached at its other end to the rib for pivotal adjustment, whereby the instrument may be supported over or adjacent the hole.

RAY L. TRIPLETT.